United States Patent
Zhang (10) Patent No.: US 10,432,038 B2
(45) Date of Patent: Oct. 1, 2019

(54) ELECTRONIC DEVICE AND WIRELESS CHARGING METHOD AND APPARATUS FOR ELECTRONIC DEVICE

(71) Applicant: ZTE Corporation, Shenzhen (CN)

(72) Inventor: Yongliang Zhang, Shenzhen (CN)

(73) Assignee: XI'AN Zhongxing New Software Co., LTD., Shaanxi (CN)

( * ) Notice: Subject to any disclaimer, the term of this patent is extended or adjusted under 35 U.S.C. 154(b) by 128 days.

(21) Appl. No.: 15/504,510

(22) PCT Filed: Oct. 20, 2014

(86) PCT No.: PCT/CN2014/088973
§ 371 (c)(1),
(2) Date: Feb. 16, 2017

(87) PCT Pub. No.: WO2015/117371
PCT Pub. Date: Aug. 13, 2015

(65) Prior Publication Data
US 2017/0237278 A1    Aug. 17, 2017

(30) Foreign Application Priority Data
Aug. 20, 2014 (CN) .......................... 2014 1 0412529

(51) Int. Cl.
*H02J 50/90* (2016.01)
*H02J 7/02* (2016.01)
(Continued)

(52) U.S. Cl.
CPC ............. *H02J 50/90* (2016.02); *G01B 7/003* (2013.01); *H02J 7/0042* (2013.01); *H02J 7/025* (2013.01); *H02J 50/10* (2016.02)

(58) Field of Classification Search
CPC ..................................................... H02J 50/90
(Continued)

(56) References Cited

U.S. PATENT DOCUMENTS

2009/0079270 A1* 3/2009 Jin .......................... H02J 5/005
307/104
2012/0319644 A1  12/2012 Hu
(Continued)

FOREIGN PATENT DOCUMENTS

CN      101924400 A     12/2010
CN      103683519 A      3/2014
(Continued)

OTHER PUBLICATIONS

International Search Report for corresponding application No. PCT/CN2014/088973 filed on Oct. 20, 2014; dated Mar. 31, 2015.
(Continued)

*Primary Examiner* — David V Henze-Gongola
(74) *Attorney, Agent, or Firm* — Cantor Colburn LLP (57) ABSTRACT

Provided are an electronic device and a wireless charging method and apparatus for an electronic device. In the wireless charging method, an environmental parameter transmitted by a wireless charging device is detected (S102); and a receiving antenna board within an electronic device is moved to a designated position according to the environmental parameter, wherein charging efficiency for charging the electronic device at the designated position is higher than charging efficiency for charging the electronic device at other positions (S104). The problems of wasting time and poor user experience caused by adjusting back and forth the electronic device in the process of wireless charging are solved. Free positioning of the antenna can be implemented, and time required by matching the electronic device and a wireless power supply device in the process of wireless charging can be greatly reduced.

11 Claims, 7 Drawing Sheets

(51) Int. Cl.
  *H02J 50/10*  (2016.01)
  *H02J 7/00*  (2006.01)
  *G01B 7/00*  (2006.01)
(58) Field of Classification Search
  USPC .......................................................... 320/108
  See application file for complete search history.

(56) References Cited

U.S. PATENT DOCUMENTS

2013/0038272 A1\* 2/2013 Sagata ...................... B60L 3/12
  320/106
2015/0372529 A1\* 12/2015 Lampinen ............... H02J 5/005
  455/572

FOREIGN PATENT DOCUMENTS

| EP | 2688182 A2 | 1/2014 |
|----|------------|--------|
| JP | 833112 A | 2/1996 |
| JP | 08033112 | 2/1996 |
| JP | 2010246348 A | 10/2010 |
| JP | 201265484 A | 3/2012 |
| JP | 2013090352 A | 5/2013 |
| JP | 201464375 A | 4/2014 |
| JP | 2014088092 A | 5/2014 |
| JP | 2014165967 A | 9/2014 |
| WO | 2011125632 A1 | 10/2011 |
| WO | 2014030294 A1 | 2/2014 |

OTHER PUBLICATIONS

European Search Report for corresponding application EP14881923; dated Jul. 21, 2017.

\* cited by examiner

ELECTRONIC DEVICE AND WIRELESS CHARGING METHOD AND APPARATUS FOR ELECTRONIC DEVICE

TECHNICAL FIELD

The present disclosure relates to the field of communications, and more particularly, to an electronic device and a wireless charging method and apparatus for an electronic device.

BACKGROUND

Wireless charging technologies have been widely applied to electronic devices, especially to portable electronic devices (mobile terminals, tablet computers, etc.), and have broad development prospect, because of its convenience of being not restricted by the wired charging cable connection.

A wireless charging receiving terminal at the electronic device side and a transmitting terminal of a wireless charging device carry out a close-range energy exchange. For the wireless charging standard Qi introduced by Wireless Power Consortium (referred to as WPC) in the form of electromagnetic induction, the wireless charging technology Power Matters Alliance (PMA) launched by Powermat, and the Alliance for Wireless Power (A4WP) technology created by WPC formed by Qualcomm Incorporated, Samsung and Powermat in the form of magnetic resonance, there are problems of electromagnetic conversion efficiency. That is, it is impossible to achieve the complete conversion of the transceiving energy, and the excess energy is often dissipated in the form of heat loss.

In order to reduce this dissipation and improve the efficiency, in a wireless charging technology in the form of electromagnetic induction in which the technology is relatively mature at present, in addition to the fact that the transmitting antenna board for wireless charging (the winding forms a plurality of concentric rings, and the ferrite substrate forms a flat board) and the receiving antenna board for wireless charging are basically the same in size and the distance therebetween is controlled in a range from 2 mm to 4 mm, a typical positioning manner such as a fixed and freely positioning manner is used. The fixed positioning manner usually increases, in the center of the ring, magnet for positioning the wireless charging receiving terminal and transmitting terminal. The freely positioning manner is to adopt a plurality of overlapped receiving antenna loops at the receiving terminal to ensure that the magnetic induction amount of different points in the effective range is basically uniform, thereby achieving the "free positioning".

However, even if the positioning measure is taken, due to the difference in size of practical mechanical processing between the individual devices, when the electronic device is placed on the transmitting antenna board of the charger, though the transmitting board of the charger relatively evenly distributes the energy field, the fixed receiving board of the electronic device cannot be ensured to be located just right on the maximum point of the energy conversion efficiency of the transmitting board, and users often still need to move back and forth the electronic device (actually to match the position of the receiving antenna board of the electronic device and the position of the transmitting antenna board at the charger side) during practical use to find the highest efficiency point. The system interface of the electronic device also prompts the high point of charging efficiency to users based on the movement of the electronic device so that the user can complete the charging in a shorter time. Since a certain time loss is required for the adjustment and for the response of the charging system, the user experience is not very good.

In the case of the wireless charging technology in the form of electromagnetic induction, though the charging transmitting terminal and the charging receiving terminal may be located in a relatively distant and relatively free position of about 50 cm, since the transmitting terminal of the magnetic resonance field is in the form of an array of a plurality of continuous transmitting boards, the fixed receiving board of the electronic device cannot be ensured to be located just right on a particular transmitting board to achieve the maximum point of the energy conversion efficiency, and there are also some factors of loss.

There is no effective solution at present for the problems of wasting time and poor user experience caused by adjusting back and forth the electronic device in the process of wireless charging of the electronic device needing to be charged in the related art.

SUMMARY

Embodiments of the present disclosure provide a wireless charging method and apparatus for an electronic device to at least solve the above problems.

According to an embodiment of the present disclosure, there is provided a wireless charging method for an electronic device, including: detecting an environmental parameter transmitted by a wireless charging device; and moving a receiving antenna board within the electronic device to a designated position according to the environmental parameter, wherein charging efficiency for charging the electronic device at the designated position is higher than charging efficiency for charging the electronic device at other positions.

In an exemplary embodiment, moving the receiving antenna board within the electronic device to the designated position according to the environmental parameter may include: determining a center position of a transmitting antenna board in the wireless charging device according to the environmental parameter; and moving the receiving antenna board to a position matching with the center position, wherein the position matching with the center position is taken as the designated position.

In an exemplary embodiment, prior to moving the receiving antenna board within the electronic device to the designated position according to the environmental parameter, the method may further include: reserving a designated region on a back surface of the electronic device or a protective cover of the electronic device, wherein the designated region is a range of movement of the receiving antenna board.

In an exemplary embodiment, prior to moving the receiving antenna board within the electronic device to the designated position according to the environmental parameter, the method may further include: reserving a designated region on a back surface of the electronic device or a protective cover of the electronic device, wherein the designated region is a range of movement of the receiving antenna board. In an exemplary embodiment, moving the receiving antenna board to the position matching with the center position may include: firstly dividing the designated region to obtain firstly divided regions and controlling the receiving antenna board to move on the firstly divided regions; when detecting that the environmental parameter exceeds a predetermined threshold, further dividing a firstly divided region of which the environmental parameter exceeds the predetermined threshold into further divided regions; and controlling the receiving antenna board to move on the further divided regions.

In an exemplary embodiment, moving the receiving antenna board within the electronic device to the designated position according to the environmental parameter may include: generating a first control instruction and/or a second control instruction according to the environmental parameter; triggering, by the first control instruction, a first driving device to control a rotating transverse axis to drive the receiving antenna board to translate up and down within the designated region, wherein the rotating transverse axis is provided within the designated region; and triggering, by the second control instruction, a second driving device to control a rotating longitudinal axis to drive the receiving antenna board to translate left and right within the designated region, wherein the rotating longitudinal axis is provided within the designated region.

In an exemplary embodiment, a first piston, a second piston, a third piston and a fourth piston are provided within the designated region, wherein a first position of the first piston and a second position of the second piston are perpendicular to each other; the third piston has a linkage relationship with the first piston, and the fourth piston has a linkage relationship with the second piston; moving the receiving antenna board within the electronic device to the designated position according to the environmental parameter may include: generating a third control instruction and/or a fourth control instruction according to the environment parameter; and triggering, by the third control instruction, a third driving device to control the third piston to drive the first piston to transversely push the receiving antenna board, and/or triggering, by the fourth control instruction, a fourth driving device to control the fourth piston to drive the second piston to longitudinally push the receiving antenna board.

In an exemplary embodiment, hydraulic fluid is filled between the first piston and the receiving antenna board and between the second piston and the receiving antenna board.

In an exemplary embodiment, prior to moving the receiving antenna board within the electronic device to the designated position according to the environmental parameter, the method may further include: detecting temperature of the receiving antenna board, and acquiring charging efficiency of the electronic device; determining whether the temperature exceeds a first preset threshold and whether the charging efficiency is lower than a second preset threshold; and triggering to move the receiving antenna board within the electronic device to the designated position in at least one of the following conditions that: number of times that the temperature exceeds the first preset threshold exceeds a first preset value, and number of times that the charging efficiency is lower than the second preset threshold exceeds a second preset value.

In an exemplary embodiment, when determining that the number of times that the temperature exceeds the first preset threshold does not exceed the first preset value and the number of times that the charging efficiency is lower than the second preset threshold does not exceed the second preset value, it is determined whether electric quantity of the electronic device is full, wherein charging is stopped in a case that the electric quantity of the electronic device is full.

According to another embodiment of the present disclosure, there is also provided an electronic device, including: a receiving antenna board for wireless charging; a sensor provided on the receiving antenna board and arranged to detect an environmental parameter transmitted by a wireless charging device; and a controller arranged to generate a control instruction based on the environmental parameter and transmit the control instruction to a driving device; the driving device arranged to move, when being triggered by the control instruction, the receiving antenna board within the electronic device to a designated position, wherein charging efficiency for charging the electronic device at the designated position is higher than charging efficiency for charging the electronic device at other positions.

In an exemplary embodiment, the receiving antenna board is arranged to reserve a designated region on a back surface of the electronic device or a protective cover of the electronic device, wherein the designated region is a range of movement of the receiving antenna board.

In an exemplary embodiment, the driving device may include: a first driving device and a second driving device, and the electronic device may further include: a rotating transverse axis provided in the designated region and connected to the first driving device, wherein the rotating transverse axis is connected to the receiving antenna board by a bearing mechanism or the rotating transverse axis is connected to the receiving antenna board by a conveyor belt; and a rotating longitudinal axis provided in the designated region and connected to the second driving device, wherein the rotating longitudinal axis is connected to the receiving antenna board by a conveyor belt or the rotating longitudinal axis is connected to the receiving antenna board by a bearing mechanism.

In an exemplary embodiment, the driving device may include: a third driving device and a fourth driving device, and the electronic device may further include: a first piston, a second piston, a third piston and a fourth piston provided in the designated region, wherein a first position of the first piston and a second position of the second piston are perpendicular to each other; the third piston has a linkage relationship with the first piston, and the fourth piston has a linkage relationship with the second piston; wherein the first piston is connected to the third driving device, and the second piston is connected to the fourth driving device.

In an exemplary embodiment, hydraulic fluid is filled between the first piston and the receiving antenna board and between the second piston and the receiving antenna board.

In an exemplary embodiment, the electronic device may further include: a temperature sensor connected to the controller and arranged to detect temperature of the receiving antenna board.

According to another embodiment of the present disclosure, there is also provided a wireless charging apparatus for an electronic device, including: a detecting module arranged to detect an environmental parameter transmitted by the wireless charging device; and a moving module arranged to move a receiving antenna board within the electronic device to a designated position according to the environmental parameter, wherein charging efficiency for charging the electronic device at the designated position is higher than charging efficiency for charging the electronic device at other positions.

According to the embodiments of the present disclosure, with the technical solution in which the position of the receiving antenna board within the electronic device is adjusted according to the acquired environmental parameter, the problems of wasting time and poor user experience caused by adjusting back and forth the electronic device in the process of wireless charging of the electronic device needing to be charged in the related art are solved. Free positioning of the antenna can be implemented, and time required by matching the electronic device and the wireless power supply device in the process of wireless charging can be greatly reduced.

BRIEF DESCRIPTION OF THE DRAWINGS

The drawings are described here to provide further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and the embodiments in detail. It is important to note that the embodiments of the present disclosure and the characteristics in the embodiments can be combined under the condition of no conflicts.

Other characteristics and advantages of the embodiments of the present disclosure will be set forth in the description which follows, and will become apparent from the description in a designated manner, or may be learned by practice of the present disclosure. The purposes and other advantages of the present disclosure may be realized and attained by the structure particularly pointed out in the written description, claims, and drawings.

Figure 1:
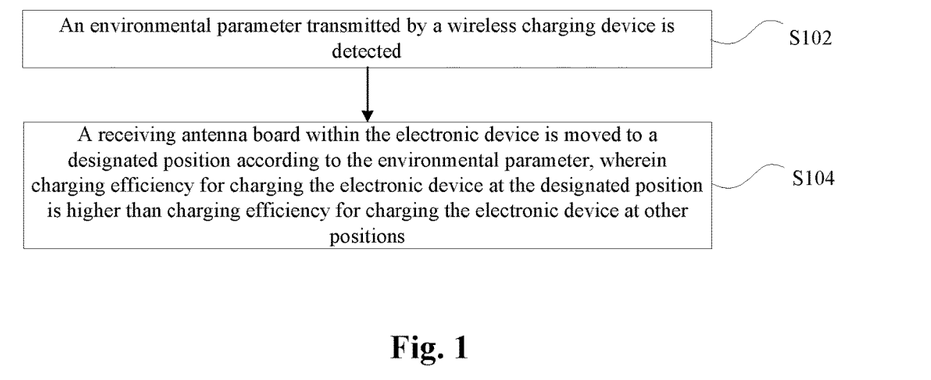
FIG. 1 is a flow chart of a wireless charging method for an electronic device according to an embodiment of the present disclosure.

An embodiment of the present disclosure provides a wireless charging method for an electronic device. FIG. 1 is a flow chart of a wireless charging method for an electronic device according to an embodiment of the present disclosure. As shown in FIG. 1, the method includes the following steps.

Step S102: An environmental parameter transmitted by a wireless charging device is detected.

Step S104: A receiving antenna board within the electronic device is moved to a designated position according to the environmental parameter, wherein charging efficiency for charging the electronic device at the designated position is higher than charging efficiency for charging the electronic device at other positions.

According the above steps, with the technical solution in which the position of the receiving antenna board within the electronic device is adjusted according to the acquired environmental parameter, the problems of wasting time and poor user experience caused by adjusting back and forth the electronic device in the process of wireless charging of the electronic device needing to be charged in the related art are solved. Free positioning of the antenna can be implemented, and time required by matching the electronic device and the wireless power supply device in the process of wireless charging can be greatly reduced.

In Step S104, moving the receiving antenna board within the electronic device to the designated position according to the environmental parameter may include: determining a center position of a transmitting antenna board in the wireless charging device according to the environmental parameter; and moving the receiving antenna board to a position matching with the center position, wherein the position matching with the center position is taken as the designated position.

In an alternative embodiment of the present disclosure, prior to moving the receiving antenna board within the electronic device to the designated position according to the environmental parameter, the method may further include: reserving a designated region on the back surface or a protective cover of the electronic device, wherein the designated region is a range of movement of the receiving antenna board.

Alternatively, moving the receiving antenna board to the position matching with the center position may include: firstly dividing the designated region to obtain firstly divided regions and controlling the receiving antenna board to move on the firstly divided regions; when detecting that the environmental parameter exceeds a predetermined threshold, further dividing a firstly divided region of which the environmental parameter exceeds the predetermined threshold into further divided regions; and controlling the receiving antenna board to move on the further divided regions. In the embodiment of the present disclosure, in the matching method in which the antenna can be freely positioned, a "two-step" coordinate scanning method of coarse scan and fine scan in the movable range is proposed to match the positioning of the wireless charging transmitting antenna.

In the embodiment of the present disclosure, moving the receiving antenna board within the electronic device to the designated position according to the environmental parameter mainly includes the following two cases.

The First Case

Moving the receiving antenna board within the electronic device to the to designated position according to the environmental parameter may include: generating a first control instruction and/or a second control instruction according to the environmental parameter; triggering, by the first control instruction, a first driving device to control a rotating transverse axis to drive the receiving antenna board to translate up and down within the designated region, wherein the rotating transverse axis is provided in the designated region; and triggering, by the second control instruction, a second driving device to control a rotating longitudinal axis to drive the receiving antenna board to translate up and down within the designated region, wherein the rotating longitudinal axis is provided in the designated region.

Figure 2:
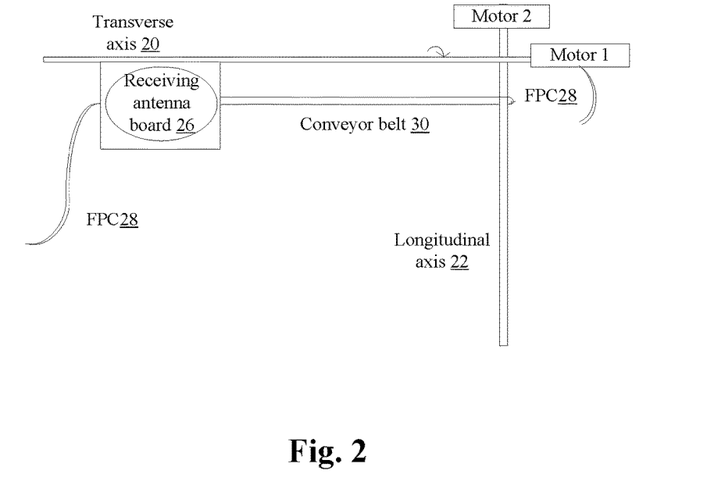
FIG. 2 is an architectural schematic diagram of an electronic device according to an exemplary embodiment of the present disclosure.

In order to better understand the workflow of the first case described above, the following description is made in connection with an exemplary embodiment. FIG. 2 is an architectural schematic diagram of an electronic device according to an exemplary embodiment of the present disclosure. As shown in FIG. 2, a hollow region of a suitable area which does not affect the strength of the structure and the performance of the machine is reserved inside a back cover of an electronic device (for example, a back cover of a large-screen mobile phone, a tablet computer and other products, hereinafter referred to as an electronic device housing) or a housing of an accessory which holds the back cover (for example, a housing inside the leather sheath used as the accessory of a large-screen mobile phone, a tablet computer and other products, hereinafter referred to as an accessory housing). There are two cylindrical long axes which are rotatable in the transverse and longitudinal directions on the edge of the hollow region. The transverse axis 20 can be translated in a rolling way, and the longitudinal axis 22 is fixed. The wireless charging receiving antenna board is mounted (e.g., the antenna is fixed to a bearing mechanism 24, and the bearing mechanism 24 is wound around the transverse axis 20) to the transverse axis 20 driven by motor 1 (the motor provided in the embodiment of the present disclosure is not used for conventional vibratory function), and may be translated up and down with the rotation of the transverse axis 20. Both the receiving antenna board 26 and the motor 1 are connected to the electronic system of the entire system through a retractable Flexible Printed Circuit 28 (FPC) which meets the maximum moving distance. The longitudinal axis 22 driven by the motor 2 is connected to the central axis of the receiving antenna board 26 by a conveyor belt 30, and the receiving antenna board 26 can be translated in the left-right direction when the longitudinal axis is rolled. Of course, the left and right translations are really implemented.

There are several points to be noted, which are described as follows. 1. The conveyor belt 30, instead of being annularly closed, is preferably U-shaped, and both ends of the U-shaped belt are fixed separately at the motor-driven longitudinal axis 22 or the center axis at the receiving antenna board 26 side (additional mechanical elements are required to be added), and can be wound in at least one fixed position. 2. In the position of the conveyor belt on the longitudinal axis 22, mechanical elements are also required to be added, which are secured to the motor of the transverse axis 20 while socketing the longitudinal axis 22. In this way, when the transversal axis 20 is translated, the socket element follows the translation, and the conveyor belt 30 and the transverse axis 20 are always kept in a parallel state. The additional mechanical elements that are required to be added are not shown in FIG. 2.

In this way, the thickness of the antenna board can be controlled at 0.45 mm (FPC antenna 0.15 mm+ferrite 0.3 mm). In addition, since the presence of the conveyor belt and the two side-axes has requirements of height for the hollow region, it is estimated that the hollow region requires 1.05 mm to 1.25 mm at a minimum. In addition, taking into account the wall thickness of the outer side of the hollow region, the battery case will have a thickness of 1.65 mm to 1.85 mm when the battery case is treated according to a conventional process. Of course, a new process may be adopted to further reduce the thickness of the battery case.

Alternatively, in order to reduce some problems, that are hard to overcome, in mechanical noise and system heat dissipation existed in the air layer of the hollow region, liquid which has dual purposes of lubricating and radiating and buffers the mechanical noise can be filled. This liquid may be lubricating oil, hydraulic fluid, etc., and is preferably the liquid with the category whose specific heat capacity is larger. Because not all of the energy of the wireless charging itself can be converted, and there is a problem of efficiency, the problem that the heat loss of the wireless charging due to the excess energy converted into heat energy needs to be dissipated is solved satisfactorily.

The Second Case

A first piston, a second piston, a third piston and a fourth piston are provided in the designated region, wherein the first position of the first piston and the second position of the second piston are perpendicular to each other; the third piston has a linkage relationship with the first piston, and the fourth piston has a linkage relationship with the second piston. Moving the receiving antenna board within the electronic device to the designated position according to the environmental parameter may include: generating a third control instruction and/or a fourth control instruction according to the environment parameter; and triggering, by the third control instruction, a third driving device to control the third piston to drive the first piston to transversely push the receiving antenna board, and/or triggering, by the fourth control instruction, a fourth driving device to control the fourth piston to drive the second piston to longitudinally push the receiving antenna board.

Alternatively, hydraulic fluid is filled between the first piston and the receiving antenna board and between the second piston and the receiving antenna board.

Figure 3:
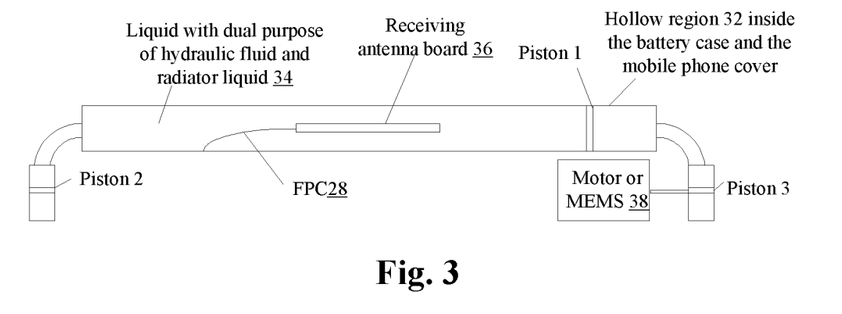
FIG. 3 is a longitudinal-section schematic diagram of an electronic device according to an embodiment of the present disclosure.

FIG. 3 is a longitudinal-section schematic diagram of an electronic device according to an embodiment of the present disclosure. As shown in FIG. 3, in the longitudinal-section view of the hydraulic system of the electronic device, the hollow region 32 inside the back cover and protective cover of the electronic device are located right above, and is filled with liquid 34 which serves as both hydraulic fluid and radiator liquid. The liquid 34 which serves as both hydraulic fluid and radiator liquid wraps a movable wireless charging antenna board 36 (namely, the receiving antenna board 26 of the embodiment) (which is connected to the system electronic unit by the FPC 28 having a sufficient flexural amplitude) therein. A motor-driven and active and passive small piston unit is located on the side of the body of the electronic device.

Figure 4:
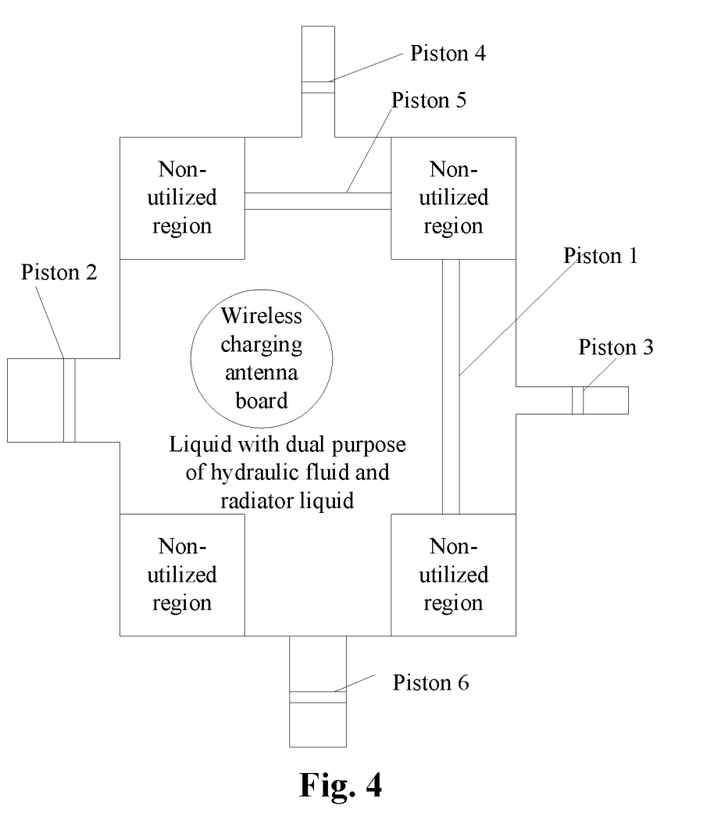
FIG. 4 is a plane schematic diagram of an electronic device according to an exemplary embodiment of the present disclosure.

In order to better understand the workflow of the second case described above, the following description will be made in connection with an exemplary embodiment. FIG. 4 is a plane schematic diagram of an electronic device according to an exemplary embodiment of the present disclosure. As shown in FIG. 4, liquid 34 with the hydraulic and heat dissipation usage is filled in the outer space of the wireless charging receiving antenna board 26 in the hollow region 32 inside the back cover and the protective cover of the electronic device. The system regulates the moving position of the receiving antenna board by the micro hydraulic system. The piston 5 in FIG. 4 is equivalent to the first piston in the embodiment, the piston 4 is equivalent to the third piston in the embodiment, the piston 1 is equivalent to the second piston in the embodiment, and the piston 3 is equivalent to the fourth piston in the embodiment. Since not all the area of the back cover or protective cover of the electronic device can be used as the region for the wireless charging antenna, especially the four corners, which are usually the regions which are occupied by the antenna or whose structure needs to be enhanced, the hollow region except the four regions can be reserved for the hydraulic system. The pistons 1 and 3 are linked, and the pistons 4 and 5 are linked. According to the principle of hydraulic Pascal ($F2/S2=F1/S1=P$, the areas of the large and small pistons are $S2$ and $S1$ respectively, the acting force on the pistons are $F2$ and $F1$ respectively, and the pressure $P$ at any point in confined liquid is equal), the relatively small driving force at the piston 3 and the piston 4 can generate a relatively large force in the pistons 1 and 5 and push the wireless charging antenna board wrapped in the hydraulic fluid to displace in both the horizontal and vertical directions. The piston 2 and the piston 6 bear the pushing and inhaling of the hydraulic fluid in both the horizontal and vertical directions as passive components. This solution requires an auxiliary mechanical structure to restrict the coordinate of the wireless antenna board 36, i.e., the transverse movement and the longitudinal movement are not simultaneously carried out. The longitudinal piston does not move during the transverse movement; and the transverse piston does not move during the longitudinal movement. When placed obliquely, regarding the error caused by gravity, the system corrects the coordinate deviation according to the inclination value captured by the gravity sensor.

The liquid surrounding the antenna receiving board 36 (which is connected to the electronic device electronic system by means of the FPC 28 whose degree of flexibility is ensured, after the translation is completed, the center axis is fixed by the auxiliary mechanical elements on the board which are driven by the electric power and eject from the upper and lower directions, and the fixation is removed prior to the next movement) within the hollow region 32 is required to be non-conductive liquid (which may be hydraulic oil with a lubricating effect), to avoid interference to the receiving performance of the receiving antenna. The piston 1 and the piston 3 are linked, and there is no need to fill any liquid in the cavity therebetween. The piston 3 is driven and controlled by a motor or Microelectro Mechanical System 38 (referred to as MEMS) controlled by an electronic device system, so as to implement up-and-down translation. The piston 2 is a passive component (which may also be controlled by the motor or MEMS) and is primarily used to dynamically swallow and spit heat dissipation liquid 34 in response to the extrusion and suction of the heat dissipation liquid 34 performed by the piston 1. Optionally, the synchronously operating motor or MEMS mechanical power driving device the same as the control piston 3 can be added on the piston 2 side.

In order to realize the movement control of the receiving antenna board, the hydraulic systems (at least two hydraulic systems are provided, and more hydraulic systems may be provided) are provided on the long side and the short side of the hollow region respectively. The hydraulic control terminal may be bent to the side regions of the body of the electronic device, where thicker components can be accommodated. The hydraulic pushing may be driven by the motor or MEMS (which does not take up the thickness of the hollow region), meeting both thinning and cooling requirements.

In the embodiment, the hollow region has no edge axis and conveyor belt. As long as the thickness of the hollow region is controlled to be thinnest, the thickness of the hollow region can be controlled to be 0.95 mm to 1.05 mm. In addition, taking into account the wall thickness of the outer side of the hollow region, the battery case will have a thickness of 1.45 mm to 1.65 mm when the battery case is treated according to a conventional process. Of course, a new process may be adopted to further reduce the thickness of the battery case.

According to an embodiment of the present disclosure, there is provided a further improvement to the solution. Prior to moving the receiving antenna board within the electronic device to the designated position according to the environmental parameter, the method may further include: detecting the temperature of the receiving antenna board, and acquiring the charging efficiency of the electronic device; determining whether the temperature exceeds a first preset threshold and whether the charging efficiency is lower than a second preset threshold; and triggering to move the receiving antenna board within the electronic device to the designated position in at least one of the following conditions that: number of times that the temperature exceeds the first preset threshold exceeds a first preset value, and number of times that the charging efficiency is lower than the second preset threshold exceeds a second preset value; when determining that the number of times that the temperature exceeds the first preset threshold does not exceed the first preset value and the number of times that the charging efficiency is lower than the second preset threshold does not exceed the second preset value, it is determined whether the electric quantity of the electronic device is full, wherein charging is stopped in a case that the electric quantity of the electronic device is full.

In conclusion, the embodiments of the present disclosure provide a device in which the receiving antenna board of the electronic device can move relatively freely during wireless charging. In the device, the wireless charging receiving antenna board is placed in the hollow region of the back cover or protective cover of the electronic device, and free positioning of the wireless charging receiving can be achieved by virtue of a mechanical transmission mechanism or a hydraulic mechanism controlled by the central processor of the electronic device. At the same time, the hollow region is filled with liquid for heat dissipation and hydraulic usage, thereby achieving heat dissipation in the process of charging.

Alternatively, one or more temperature, magnetic, or other sensors may be added at the center position of the freely positioning wireless charging receiving antenna. The sensor can move as the wireless charging receiving antenna moves, dynamically detect the heat, magnetic intensity, resonance intensity and other information after the position is changed, and pass the information to the central processor for calculation. Then a central processor controls the receiving antenna board to move, achieving free positioning, periodic displacement and related intelligent processing of the antenna position.

According to the above technical solution provided by the embodiments of the present disclosure, a wireless charging receiving antenna board which moves freely and positions freely is provided inside the housing of an electronic device (mobile terminals, tablet computers, etc.) or the housing of an accessory. As the housing of the smart portable electronic devices, especially the large screen mobile terminals, tablet computers and other products of 5 inches or more, has a large plane area, which can provide an ideal condition for the free moving and free positioning of the wireless charging receiving antenna board.

Figure 5:
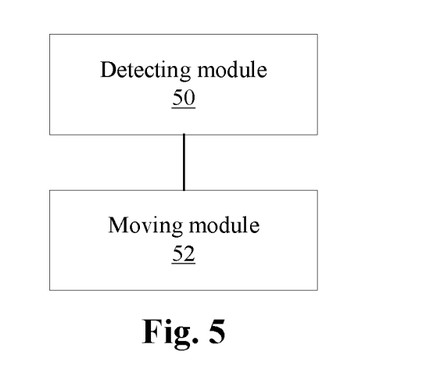
FIG. 5 is a structure block diagram of a wireless charging apparatus of an electronic device according to an embodiment of the present disclosure.

In another embodiment, there is also provided a wireless charging apparatus of an electronic device for implementing the above embodiments and exemplary embodiments. What has been described will not be described in detail. The meaning of the term "module" involved in the apparatus is explained as follows. As used below, the term "module" may be implemented as a combination of software and/or hardware with a predetermined function. Although the apparatus described in the following embodiments is preferably implemented in software, the implementation of hardware or a combination of software and hardware is also possible and contemplated. FIG. 5 is a structure block diagram of a wireless charging apparatus of an electronic device according to an embodiment of the present disclosure. As shown in FIG. 5, the apparatus may include:

a detecting module 50 arranged to detect an environmental parameter transmitted by the wireless charging device; and a moving module 52 connected to the detecting module 50 and arranged to move a receiving antenna board within the electronic device to a designated position according to the environmental parameter, wherein charging efficiency for charging the electronic device at the designated position is higher than charging efficiency for charging the electronic device at other positions.

Through the combined action of the above modules, with the technical solution in which the position of the receiving antenna board within the electronic device is adjusted according to the acquired environmental parameter, the problems of wasting time and poor user experience caused by adjusting back and forth the electronic device in the process of wireless charging of the electronic device needing to be charged in the related art are solved. Free positioning of the antenna can be implemented, and time required by matching the electronic device and the wireless power supply device in the process of wireless charging can be greatly reduced.

Figure 6:
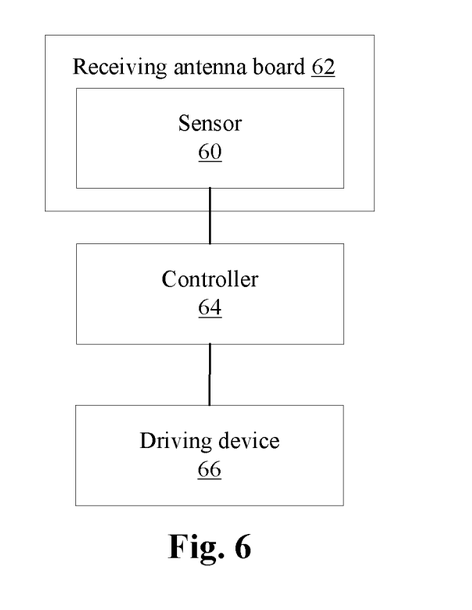
FIG. 6 is a structure block diagram of an electronic device according to an embodiment of the present disclosure.

Another embodiment of the present disclosure further provides an electronic device, including: a receiving antenna board for wireless charging. FIG. 6 is a structure block diagram of an electronic device according to an embodiment of the present disclosure. As shown in FIG. 6, the electronic device may include:

a sensor 60 provided on the receiving antenna board 62 and arranged to detect an environmental parameter transmitted by the wireless charging device; and a controller 64 connected to the sensor 60 and arranged to generate a control instruction based on the environmental parameter and transmit the control instruction to a driving device 66;

the driving device 66 arranged to move, when being triggered by the control instruction, the receiving antenna board within the electronic device to a designated position, wherein charging efficiency for charging the electronic device at the designated position is higher than charging efficiency for charging the electronic device at other positions.

Alternatively, as shown in FIG. 2, the receiving antenna board 62 is arranged to reserve a designated region on a back surface of the electronic device or a protective cover of the electronic device, wherein the designated region is a range of movement of the receiving antenna board. The driving device may include: a first driving device (corresponding to the motor 1 in FIG. 2) and a second driving device (corresponding to the motor 2 in FIG. 2), and the electronic device may further include:

a rotating transverse axis (namely, a transverse axis 20) provided in the designated region and connected to the first driving device, wherein the rotating transverse axis is connected to the receiving antenna board 26 by a bearing mechanism 24 or the rotating transverse axis is connected to the receiving antenna board 26 by a conveyor belt 30 (not shown in the figures of the solution); and a rotating longitudinal axis (namely, a longitudinal axis 22) provided in the designated region and connected to the second driving device, wherein the rotating longitudinal axis is connected to the receiving antenna board 26 by a conveyor belt 30 or the rotating longitudinal axis is connected to the receiving antenna board 26 by a bearing mechanism 24 (not shown in the solution).

In another alternative embodiment of the embodiments of the present disclosure, as shown in FIG. 4, the driving device may include: a third driving device (corresponding to the piston 3 in FIG. 4) and a fourth driving device (corresponding to the piston 4 in FIG. 4), and the electronic device may further include:

a first piston, a second piston, a third piston and a fourth piston provided in the designated region, wherein a first position of the first piston and a second position of the second piston are perpendicular to each other; the third piston has a linkage relationship with the first piston, and the fourth piston has a linkage relationship with the second piston; the first piston is connected to the third driving device, and the second piston is connected to the fourth driving device; hydraulic fluid is filled between the first piston and the receiving antenna board and between the second piston and the receiving antenna board.

Figure 7:
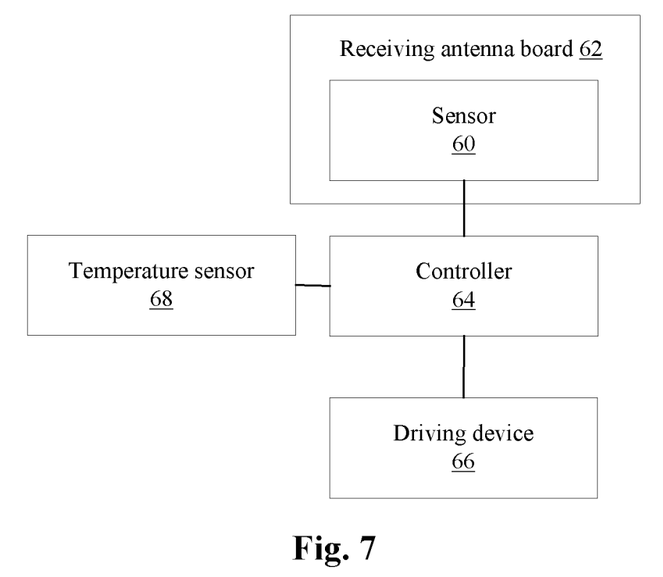
FIG. 7 is another structure block diagram of an electronic device according to an embodiment of the present disclosure.

As shown in FIG. 7, the electronic device may further include: a temperature sensor 68, which may be located on the receiving antenna board 62 (the specific positional relationship between the temperature sensor 68 and the receiving antenna board is not shown in FIG. 7), be connected to the controller 64 and be arranged to detect temperature of the receiving antenna board.

For a better understanding of the wireless power supply method and apparatus of the electronic device and the electronic device in the above embodiments, the following description will be made in connection with an exemplary embodiment, but the present disclosure is not limited thereto.

Figure 8:
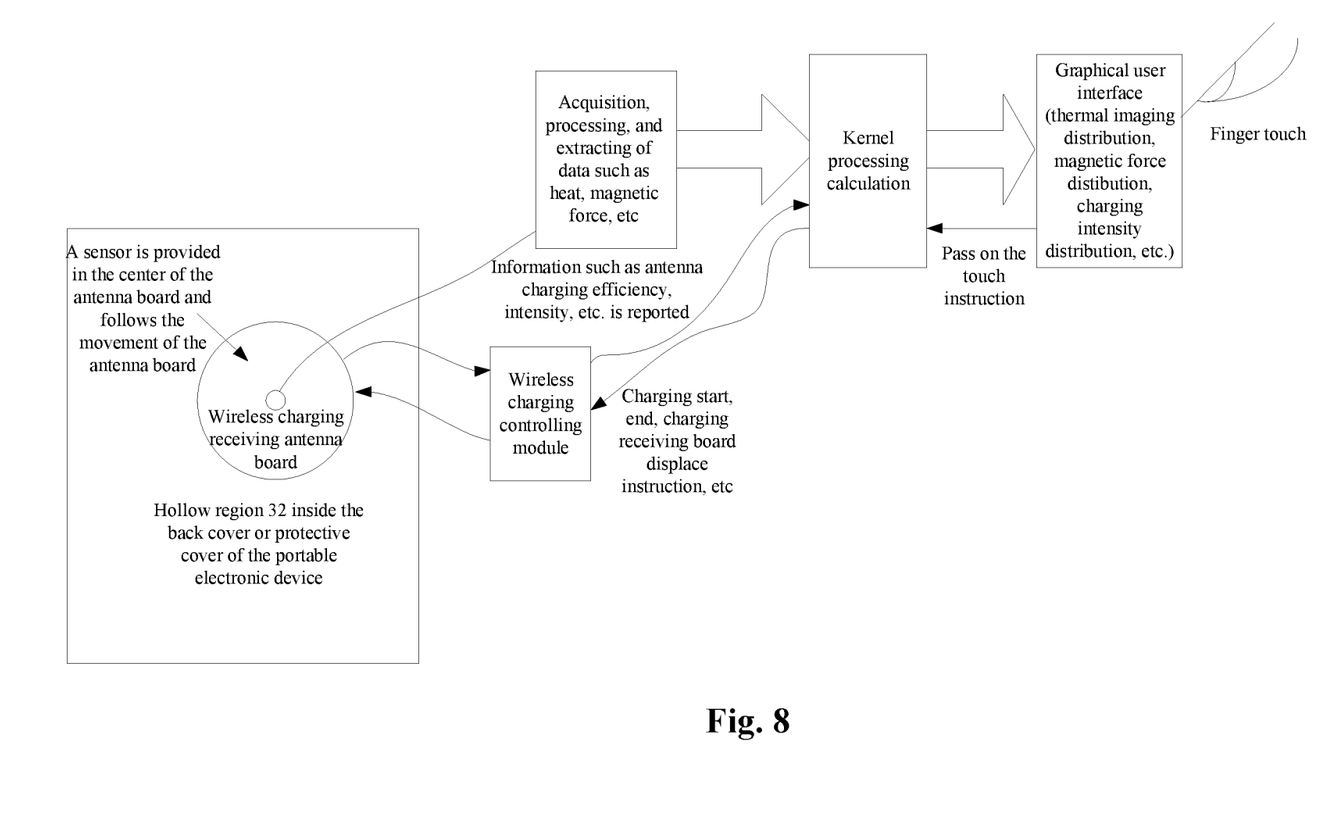
FIG. 8 is a schematic diagram of a dynamic sensing function according to an embodiment of the present disclosure.

As shown in FIG. 8, in the center position of the ring formed by the freely positioned wireless charging receiving winding antenna or the peripheral position outside the antenna (only the schematic diagram of the center position is given in FIG. 8), one or more temperature, magnetic and other sensors are provided without influencing the magnetic coupling or resonance performance. It should be noted that since the sensors have an influence on the charging efficiency in most cases, it is not suggested to directly cover the receiving winding antenna with the sensors. In the case where the receiving antenna board of the present disclosure can be moved, a single sensor is enough in the single usage of temperature or magnetic sensing, and two or more sensors are provided only for backup or enhancement. The sensor can move as the wireless charging receiving antenna moves. The typical sensors such as thermosensitive, electromagnetic coil and other sensing terminals can dynamically detect the hot spots, magnetic intensity and other information after the position is changed, and pass the information to the central processor for further determining and processing.

By integrating the information acquired by the sensor, the system power consumption efficiency calculation and the like, Graphic User Interface (referred to as GUI) may be made highly friendly and intelligent. The depth application development can be further implemented in the aspect of the application, and even some smart game applications can be developed based on the dynamic sensors.

Figure 9:
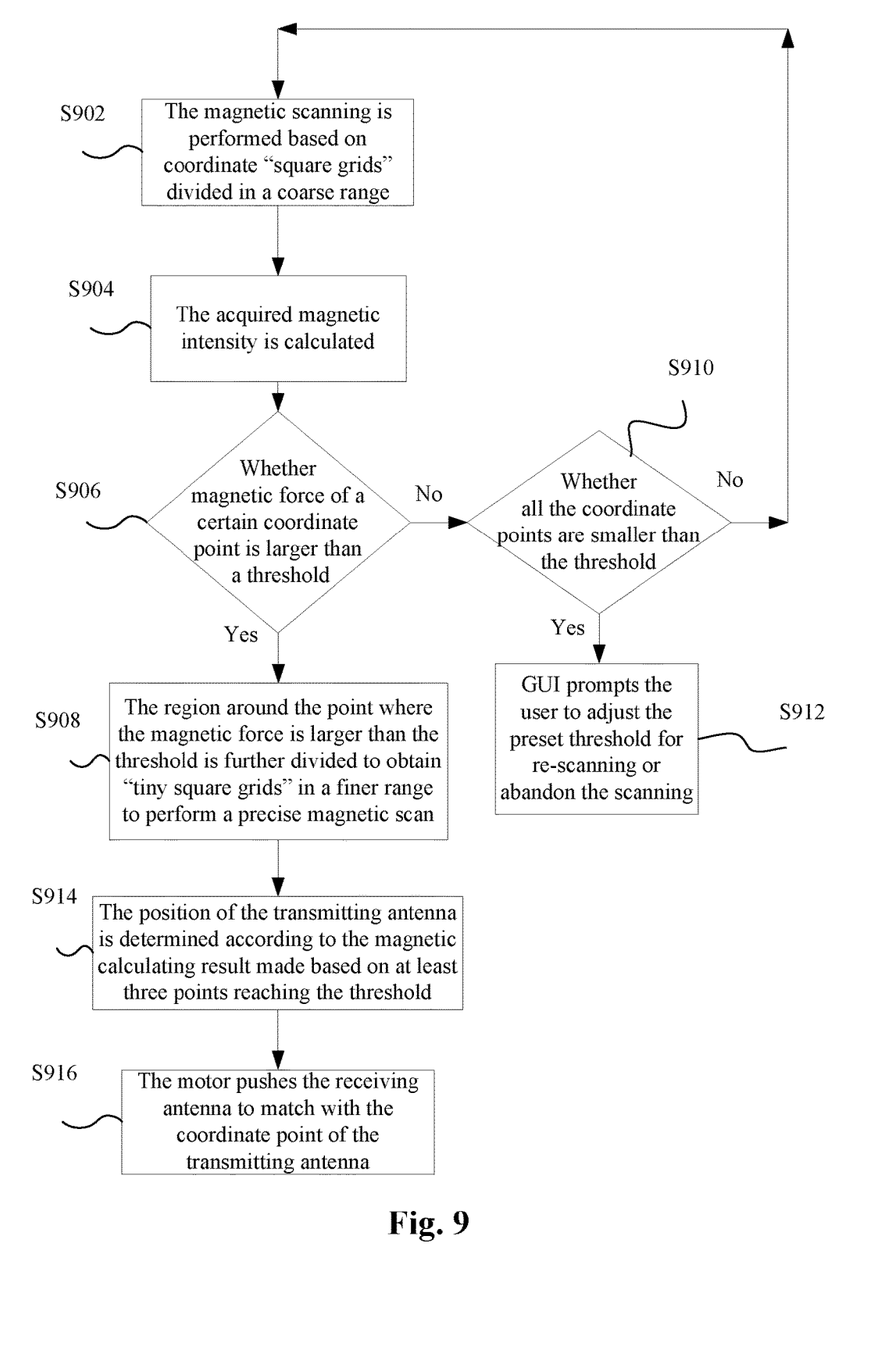
FIG. 9 is a schematic diagram for calculating the position of a transmitting antenna according to an embodiment of the present disclosure.

In order to reduce the power loss caused by full array scanning (scanning is carried out in a way of driving the motor by the system, and in particular, battery-powered portable electronic devices are very sensitive to the power loss and has a very large power loss in full array scanning), the embodiment of the present disclosure uses the method of coarsely positioning first and finely positioning subsequently, achieving the purpose of precisely positioning the transmitting terminal antenna while reducing the amount of scanning resources. As shown in FIG. 9, the specific process is as follows.

Step S902: The range movable for the center of the wireless charging receiving board is divided into coordinate "square grids" in a coarse range. For example, the range is divided into not more than ten "square grid" points, and the board moves "grid" by "grid" to perform magnetic scanning.

Step S904: The system calculates the magnetic intensity acquired by the magnetic (coil) sensor on the board.

Step S906: It is determined whether the magnetic force of a certain point reaches a preset threshold, and if the magnetic force of a certain point reaches the preset threshold, the process proceeds to Step S908, otherwise proceeds to Step S910.

Step S908: The magnetic force of a certain point reaches the preset threshold, the coarse range scanning is stopped, and the precise range scanning is started. For example, the region around the point where the magnetic force reaches the preset threshold is further divided to obtain "tiny square grids" in a finer range. The board moves tiny "grid" by tiny "grid" and continues to perform magnetic scanning, and the process proceeds to Step S914.

Step S910: It is determined whether the magnetic force values of all the coordinate points are smaller than the preset threshold, and if the magnetic force values of all the coordinate points are smaller than the preset threshold, the process proceeds to Step S912. If the magnetic force of at least one coordinate point reaches the preset threshold, the process proceeds to Step S902.

Step S912: If the magnetic force values of all the coordinate points cannot reach the preset threshold, this information is reported to the GUI interface so that the GUI informs the user of the information: if the detected magnetic force intensity does not greatly differ from the preset threshold, ask for instructions about whether the preset threshold needs to be adjusted for further scanning; if the detected magnetic force intensity greatly differs from the preset threshold, the user is prompted to abandon the scanning.

Step S914: The system performs calculation and analysis according to the result that the magnetic values of at least three points of the magnetic scanning of the tiny "grid" reach the preset threshold (for example, calculating the intersection of rings with decreasing magnetic force or performing direct frequency tracking calculation and the like), to determine the precise coordinate position of the winding antenna coil of the transmitting terminal of the wireless charger.

Step S916: The electronic device processor drives the motor to push the receiving antenna board to this coordinate.

The electronic device processor calculates the center position of the wireless charging transmitting antenna coil according to the magnetic sensor data, which will be further described. After the electronic device is placed in the vicinity of the charging board of the wireless charger, the wireless charging receiving antenna board is controlled to displace regularly in the transverse and longitudinal directions so that the electromagnetic coil on the receiving antenna board can perform magnetic intensity scanning with the displacement of the receiving antenna board and obtain enough magnetic intensity information. The precise strongest magnetic point of the wireless charging transmitting terminal can be obtained according to the magnetic intensity information array to form the accurate alignment of transmitting and receiving boards.

Figure 10:
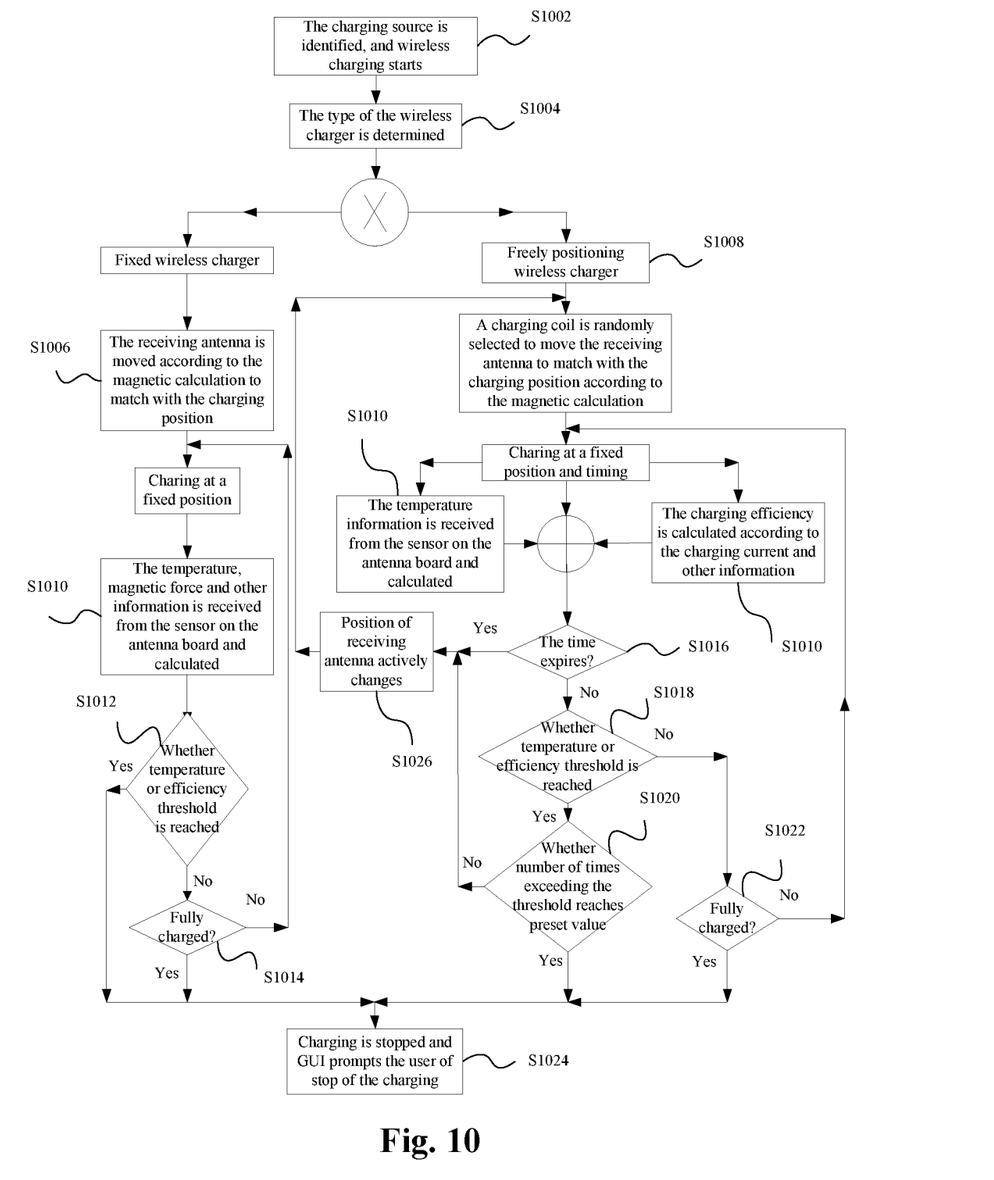
FIG. 10 is a flow chart of a power supply method for an electronic device according to an exemplary embodiment of the present disclosure.

Based on the above exemplary device solution, a method providing a basic wireless charging function can be implemented. The basic process is as follows (as shown in FIG. 10).

Step S1002: The electronic device identifies that the charging source is a wireless charging access, rather than a USB charging access, and wireless charging is started.

Step S1004: Based on the detection information of the magnetic sensor on the receiving antenna board, the type of the wireless charger transmitting antenna is determined (which is mainly divided into a fixed type and a freely positioning type; the former includes positioning magnets (permanent magnets), and magnetic sensors can easily distinguish the wireless charger transmitting antenna of the fixed type from the magnetic characteristic of the winding coil for realizing wireless charging). If the charger is determined as a fixed wireless charger, the process proceeds to Step S1006; if the charger is determined as a freely positioning wireless charger, the process proceeds to Step S1008.

Step S1006: The electronic device processor calculates the center position of the wireless charging transmitting antenna coil according to the magnetic sensing data, drives the motor to move the receiving antenna board to the corresponding position (central alignment) and starts charging. Then, the process proceeds to Step S1010.

Step S1008: The electronic device processor randomly selects one of the transmitting antenna coils of the freely positioning charger to perform the matching of the center point according to the magnetic sensing data, fixes the position, and starts charging and timing.

Step S1010: The sensor on the electronic device receiving antenna board detects the temperature and calculates the integrative charging efficiency according to the magnetic intensity, the charging current value and the like. For the fixed wireless charger, the process proceeds to Step S1012; and for the freely positioning wireless charger, the process proceeds to Step S1016.

Step S1012: It is determined whether a preset time value for timing has expired, and if the time has expired, the process proceeds to Step S1024, otherwise, the process proceeds to Step S1014.

Step S1014: It is determined whether the battery is fully charged, and if the battery is not fully charged, the process proceeds to Step S1010, and if so, the process proceeds to Step S1024.

Step S1016: It is determined whether the temperature and the efficiency exceed their respective preset thresholds (in particular, whether the temperature is higher than a threshold and the efficiency is lower than a threshold). If the temperature and the efficiency do not exceed their respective preset thresholds, the process proceeds to Step S1018, and if the temperature and the efficiency exceed their respective preset thresholds, the process proceeds to Step S1026.

Step S1018: It is determined whether a preset time value for timing has expired, and if the preset time value for timing has expired, the process proceeds to Step S1020, otherwise, the process proceeds to Step S1022.

Step S1020: It is determined whether the number of times of exceeding the threshold exceeds a predetermined value, and if the number of times of exceeding the threshold exceeds the predetermined value, the process proceeds to Step S1024, otherwise, the process proceeds to Step S1026.

Step S1022: It is determined whether the battery is fully charged, if the battery is not fully charged, the process proceeds to Step S1010, and if the battery is fully charged, the process proceeds to Step S1026.

Step S1024: Stop charging and report to the Graphic User Interface (GUI) to prompt the user. GUI interface shows different reasons for stopping of the charging due to different reasons.

Step S1026: The receiving antenna is actively displaced (avoiding the excessively high local temperature or low efficiency). After the displacement, the charging position matching is re-performed and charging is resumed.

The above temperature and charging efficiency threshold judgment provided by the embodiments of the present disclosure can realize the active displacement of the receiving antenna board when the local temperature is too high or the efficiency uniformity is very low during the charging process, that is, the heat dissipation process is conducted during the charging process and the risk of heat aggregation is reduced during the charging process.

It should be noted that the environmental parameters referred to in the embodiments of the present disclosure may include, but are not limited to, temperature parameters.

The electronic device achieves free positioning of the receiving antenna board when being wirelessly charged. The technical solution is suitable for WPC/Qi, PMA and other electromagnetic induction wireless charging scenarios. The technical solution also has practical value for the magnetic resonance (such as A4WP standard) wireless charger, the reason being described as follows. Although in this scenario, the electronic device does not have to be in close proximity to the charging dock, but is charged in the interval range of 40 mm to 50 mm, the problem of heat generation of the electronic device having the wireless charging receiving device is less severe than that of the electromagnetic induction type. Especially when a plurality of wireless chargers receive the electric energy from a common wireless charger (the wireless charger transmitting terminal is formed by a plurality of consecutive individual transmitting units) at the same time, often because the wireless charging receiving antenna boards of the corresponding existing electronic device are fixed and cannot be adapted to adjust the receiving position to match with one of the transmitting units which can obtain the maximum charging efficiency, continuous charging efficiency will still be influenced.

In conclusion, the embodiment of the present disclosure realizes the following advantages that: the problems of wasting time and poor user experience caused by adjusting back and forth the electronic device in the process of wireless charging of the electronic device needing to be charged are solved. Free positioning of the antenna can be implemented, time required by matching the electronic device and the wireless power supply device in the process of wireless charging can be greatly reduced, and the purpose of auxiliary heat dissipation is achieved.

Obviously, those skilled in the art should know that each module or step of the embodiment of the present disclosure can be implemented by a universal computing device, and the modules or steps can be concentrated on a single computing device or distributed on a network formed by a plurality of computing devices, and optionally, can be implemented by programmable codes executable for the computing devices, so that the modules or steps can be stored in a storage device for execution with the computing devices, and can execute the steps shown or described in an order different from this in some cases, or can form each integrated circuit module, or multiple modules or steps therein can form a single integrated circuit module for implementation. As a consequence, the present disclosure is not limited to any specific hardware and software combination.

The above is only the exemplary embodiment of the present disclosure and not intended to limit the present disclosure, and for the technician of the field, the present disclosure can have various modifications and variations. Any modifications, equivalent replacements, improvements and the like within the principle of the present disclosure shall fall within the scope of protection defined by the appended claims of the present disclosure.

INDUSTRIAL APPLICABILITY

According to the technical solution provided by the embodiments of the present disclosure, with the technical solution in which the position of the receiving antenna board within the electronic device is adjusted according to the acquired environmental parameter, the problems of wasting time and poor user experience caused by adjusting back and forth the electronic device in the process of wireless charging of the electronic device needing to be charged in the related art are solved. Free positioning of the antenna can be implemented, and time required by matching the electronic device and the wireless power supply device in the process of wireless charging can be greatly reduced.

What is claimed is:

1. A wireless charging method for an electronic device, comprising:
   detecting an environmental parameter transmitted by a wireless charging device; and
   moving a receiving antenna board within the electronic device to a designated position of the electronic device according to the environmental parameter, wherein charging efficiency for charging the electronic device at the designated position is higher than charging efficiency for charging the electronic device at other positions;
   wherein moving the receiving antenna board within the electronic device to the designated position according to the environmental parameter comprises:
   determining a center position of a transmitting antenna board in the wireless charging device according to the environmental parameter; and
   moving the receiving antenna board to a position matching with the center position, wherein the position matching with the center position is taken as the designated position;
   wherein prior to moving the receiving antenna board within the electronic device to the designated position according to the environmental parameter, the method further comprises:
   reserving a designated region on a back surface of the electronic device or a protective cover of the electronic device, wherein the designated region is a range of movement of the receiving antenna board;
   wherein a first piston, a second piston, a third piston and a fourth piston are provided within the designated region, wherein a first position of the first piston and a second position of the second piston are perpendicular to each other; the third piston has a linkage relationship with the first piston, and the fourth piston has a linkage relationship with the second piston; moving the receiving antenna board within the electronic device to the designated position according to the environmental parameter comprises:
generating a third control instruction and/or a fourth control instruction according to the environment parameter; and
triggering, by the third control instruction, a third driving device to control the third piston to drive the first piston to transversely push the receiving antenna board, and/or triggering, by the fourth control instruction, a fourth driving device to control the fourth piston to drive the second piston to longitudinally push the receiving antenna board.

2. The method as claimed in claim 1, wherein moving the receiving antenna board to the position matching with the center position comprises:
firstly dividing the designated region to obtain firstly divided regions and controlling the receiving antenna board to move within the firstly divided regions;
when detecting that the environmental parameter exceeds a predetermined threshold, further dividing a firstly divided region of which the environmental parameter exceeds the predetermined threshold into further divided regions; and
controlling the receiving antenna board to move within the further divided regions.

3. The method as claimed in claim 1, wherein moving the receiving antenna board within the electronic device to the designated position according to the environmental parameter comprises:
generating a first control instruction and/or a second control instruction according to the environmental parameter;
triggering, by the first control instruction, a first driving device to control a rotating transverse axis to drive the receiving antenna board to translate up and down within the designated region, wherein the rotating transverse axis is provided within the designated region; and
triggering, by the second control instruction, a second driving device to control a rotating longitudinal axis to drive the receiving antenna board to translate left and right within the designated region, wherein the rotating longitudinal axis is provided within the designated region.

4. The method as claimed in claim 1, wherein hydraulic fluid is filled between the first piston and the receiving antenna board and between the second piston and the receiving antenna board.

5. The method as claimed in claim 1, wherein prior to moving the receiving antenna board within the electronic device to the designated position according to the environmental parameter, the method further comprises:
detecting temperature of the receiving antenna board, and acquiring charging efficiency of the electronic device;
determining whether the temperature exceeds a first preset threshold and whether the charging efficiency is lower than a second preset threshold; and
triggering to move the receiving antenna board within the electronic device to the designated position in at least one of the following conditions that: number of times that the temperature exceeds the first preset threshold exceeds a first preset value, and number of times that the charging efficiency is lower than the second preset threshold exceeds a second preset value.

6. The method as claimed in claim 5, wherein when determining that the number of times that the temperature exceeds the first preset threshold does not exceed the first preset value and the number of times that the charging efficiency is lower than the second preset threshold does not exceed the second preset value, it is determined whether electric quantity of the electronic device is full, wherein charging is stopped in a case that the electric quantity of the electronic device is full.

7. The method as claimed in claim 2, wherein prior to moving the receiving antenna board within the electronic device to the designated position according to the environmental parameter, the method further comprises:
detecting temperature of the receiving antenna board, and acquiring charging efficiency of the electronic device;
determining whether the temperature exceeds a first preset threshold and whether the charging efficiency is lower than a second preset threshold; and
triggering to move the receiving antenna board within the electronic device to the designated position in at least one of the following conditions that: number of times that the temperature exceeds the first preset threshold exceeds a first preset value, and number of times that the charging efficiency is lower than the second preset threshold exceeds a second preset value.

8. The method as claimed in claim 3, wherein prior to moving the receiving antenna board within the electronic device to the designated position according to the environmental parameter, the method further comprises:
detecting temperature of the receiving antenna board, and acquiring charging efficiency of the electronic device;
determining whether the temperature exceeds a first preset threshold and whether the charging efficiency is lower than a second preset threshold; and
triggering to move the receiving antenna board within the electronic device to the designated position in at least one of the following conditions that number of times that the temperature exceeds the first preset threshold exceeds a first preset value, and number of times that the charging efficiency is lower than the second preset threshold exceeds a second preset value.

9. An electronic device, comprising a receiving antenna board for wireless charging;
a sensor provided on the receiving antenna board and arranged to detect an environmental parameter transmitted by a wireless charging device; and
a controller arranged to generate a control instruction based on the environmental parameter and transmit the control instruction to a driving device;
the driving device arranged to move, when being triggered by the control instruction, the receiving antenna board within the electronic device to a designated position of the electronic device, wherein charging efficiency for charging the electronic device at the designated position is higher than charging efficiency for charging the electronic device at other positions;
wherein the receiving antenna board is arranged to reserve a designated region on a back surface of the electronic device or a protective cover of the electronic device, wherein the designated region is a range of movement of the receiving antenna board;
wherein the driving device comprises: a first driving device and a second driving device, and the electronic device further comprises:
a rotating transverse axis provided in the designated region and connected to the first driving device, wherein the rotating transverse axis is connected to the receiving antenna board by a bearing mechanism or the rotating transverse axis is connected to the receiving antenna board by a conveyor belt; and a rotating longitudinal axis provided in the designated region and connected to the second driving device, wherein the rotating longitudinal axis is connected to the receiving antenna board by a conveyor belt or the rotating longitudinal axis is connected to the receiving antenna board by a bearing mechanism;

wherein the driving device comprises: a third driving device and a fourth driving device, and the electronic device further comprises:

a first piston, a second piston, a third piston and a fourth piston provided in the designated region, wherein a first position of the first piston and a second position of the second piston are perpendicular to each other; the third piston has a linkage relationship with the first piston, and the fourth piston has a linkage relationship with the second piston;

wherein the first piston is connected to the third driving device, and the second piston is connected to the fourth driving device.

10. The electronic device as claimed in claim 9, wherein hydraulic fluid is filled between the first piston and the receiving antenna board and between the second piston and the receiving antenna board.

11. The electronic device as claimed in claim 9, further comprising: a temperature sensor connected to the controller and arranged to detect temperature of the receiving antenna hoard.

* * * * *